United States Patent Office 2,710,853
Patented June 14, 1955

2,710,853
POLYIMIDES OF PYROMELLITIC ACID

Walter M. Edwards and Ivan Maxwell Robinson, Wilmington, Del., assignors to E. I. du Pont de Nemours and Company, Wilmington, Del., a corporation of Delaware No Drawing. Application October 19, 1953,
Serial No. 387,038

6 Claims. (Cl. 260—78)

This invention relates to a novel group of linear polymeric polyimides, and salts for producing same, said polyimides differing from previously known polyimides in properties which are important in injection molding applications.

For satisfactory injection molding of thermoplastic substances it is essential that the material to be molded be stable at temperatures needed to produce adequate flow. In using currently available injection molding equipment, it is essential that the stability of the themoplastic material be such that it retains its desirable properties for at least about 20 minutes at the injection molding temperature.

Toughness, which is the antithesis of brittleness, can be measured quantitatively, since the toughness of a resin determines its resistance to breakage on creasing. Toughness is determined by subjecting a film 3 to 7 mils thick to a series of creasing actions by folding the film through 180° and creasing, followed by folding through 360° and creasing, to complete one cycle. The number of creasing cycles which the film withstands before breaking at the crease line is referred to herein as the "degree of toughness." If a film cannot be creased without breaking it has a "degree of toughness" of zero, and if the film breaks on the second cycle, its "degree of toughness" is one, and so on. The toughness of a polymeric substance may be adversely affected by heat and/or oxygen, and tests have been developed for measuring the effect of both heat and oxygen on toughness. A test for the effect of heat on retention of toughness is to heat the molten polymer at 360° for 20 minutes under nitrogen, and to determine loss of toughness caused by such heating. A test which measures the oxidative stability of the polymer, i. e. the effect of oxygen on toughness, is to heat films of the polymer (3 to 7 mils thick) in air at 175° C. for intervals of three hours, and to measure the toughness after such exposure to air at elevated temperatures. These tests effectively distinguish those polymers which retain their toughness well, from those which do not satisfactorily retain their toughness.

The most desirable injection-moldable-thermoplastics, from the standpoint of the objectives of this invention, must not only be characterized by retention of toughness under conditions of injection molding, but must also have a capacity for retaining other important physical properties over a wide range of temperature. It is now well known that for all amorphous materials, and even for resins having a high degree of crystallinity, the changes in physical properties with temperature are less marked below a particular temperature (which is critical for each resin) than immediately above the said temperature. For example, if the stiffness of a polymeric material is plotted against temperature, the stiffness decreases gradually with increasing temperature until a "glassy state transition temperature" is reached, whereupon the stiffness decreases appreciably, over a relatively narrow temperature range. The temperature, or temperature range, at which this phenomenon occurs characterizes the polymeric material from the standpoint of its ability to resist deformation at elevated temperatures, and is referred to herein as the "glassy state transition temperature." The resins heretofore known which are outstandingly excellent from the standpoint of retention of toughness during injection molding have been limited in their applications by reason of the fact that they do not have a sufficiently high "glassy state transition temperature." This is shown in the following table.

TABLE I

"Glassy state transition temperatures" of previously known thermoplastic polymeric materials suitable for injection molding

| Polymeric Substance | "Glassy State Transition Temperature" |
|---|---|
| Polyhexamethylene adipamide | 50° C. to 75° C. |
| Polycaprolactan | 40° C. to 50° C. |
| Polyhexamethylene sebacamide | 30° C. |
| Polystyrene | 75° C. to 90° C. |
| Polyacrylonitrile | 60° C. to 85° C. |
| Methyl methacrylate polymer | 72° C. to 90° C. |
| Polyethylene | −45° C. to −70° C. |
| Polyethylene terephthalate | 65° C. to 80° C. |

Since many physical properties undergo transition at the "glassy state transition temperature," the said temperature is a useful criterion or measure of the maximum temperature at which a resin retains certain of its valuable properties in practical applications.

In view of the foregoing it is evident that an advance in the art of injection molding of thermoplastic materials would be achieved by providing a novel resin having a satisfactory degree of toughness (at least 2, preferably at least 3), which is retained well in the thermal and oxidative stability tests hereinabove described, said resin having also a "glassy state transition temperature" appreciably above the "glassy state transition temperature" of previously known materials which are suitable for injection molding, and preferably above 100°–105° C.

In addition to the desirable properties hereinabove set forth, it is important also that the resin have a melt viscosity suitable for injection molding (i. e. not exceeding $7 \times 10^6$ poises at 360° C., as measured at shear stresses of up to about 40 p. s. i.). In this connection it is also important that the resin be one which does not decompose at temperatures required to produce the tractability necessary for injection molding.

An object of the present invention is to provide novel polymers having the desirable injection molding properties hereinabove described.

The polymers which, according to the present invention, exhibit the aforesaid properties are within the general class of polymers known as linear polymeric polyimides.

The term "imide" as employed herein refers to a compound which differs structurally from a carboxylic acid anhydride by having the >O which separates the carbonyl groups in the anhydride replaced by >NH. A "linear polymeric polyimide" is a linear condensation polymer in which the imide hydrogens of a di-imide are replaced by bivalent radicals which link together the bivalent residues of the diimide molecules as recurring units of a linear polymeric chain.

The linear polymeric polyimides, as a general class of polymers have been known for many years (Br. 570,858; cf. also U. S. 2,149,286, U. S. 2,407,896, U. S. 2,421,024, U. S. 2,502,576, A. P. C. patent application S. N. 389,002, Br. 627,205, etc.). The particular polyimides which have the sought-after properties, according to this invention, are polypyromellitimides. Certain polypyromellitimides are disclosed in Br. 570,858, typical reactions for their formation being,

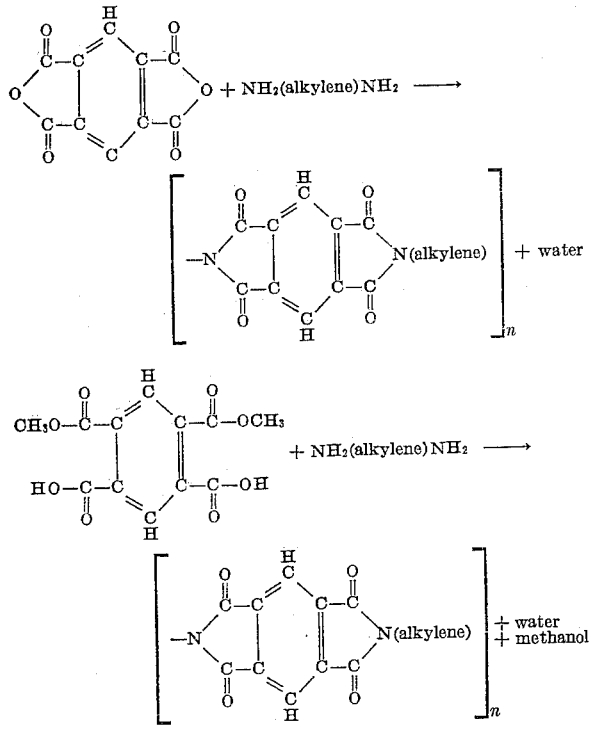

wherein $n$ is an integer, usually above 100.

Most significantly, none of the polypyromellitimides mentioned in the prior art, and none of the other previously known polyimides, exhibit the combination of properties required in the injection molding applications hereinabove mentioned. Despite this failure of all of the previously known polypyromellitimides to meet these tests, it has been found according to the present invention that there are three diamines, of which the polypyromellitimides have exceptionally excellent injection molding properties, meeting all of the aforesaid tests. These three diamines are:

1. Nonamethylenediamine
2. 4,4-dimethylheptamethylene diamine
3. 3-methylheptamethylene diamine.

It is noteworthy that closely related homologues of these diamines yield polypyromellitimides which, although capable of being drawn into fibers, do not at all meet the aforesaid requirements for injection molding. For example, the polyimide from octamethylene diamine and pyromellitic acid has a melt viscosity exceeding the maximum hereinabove specified and, in fact, requires temperatures in the range of 400° C. for determination of melt viscosity, at which temperatures it decomposes rapidly. In contrast with this, the polyimides from pyromellitic acid and 4,4-dimethylheptamethylene diamine, or nonamethylene diamine, do not decompose appreciably at temperatures required to produce the desired melt viscosity, as shown in the following table.

TABLE II

*Melt viscosities of polypyromellitimides of 4,4-dimethylheptamethylene diamine and nonamethylene diamine*

|  | 4,4-Dimethyl-heptamethyl-ene Diamine Polypyromel-litimide | Nonamethyl-ene Diamine Polypyromel-litimide |
| --- | --- | --- |
| Shear Stress (p. s. i.) | 13.6 | 20.4 |
| Temperature of measurement | 360° C. | 360° C. |
| Melt Viscosity (poises) | 8.6×10³ | 3.79×10⁵ |

The test for oxidative stability, i. e. retention of toughness upon prolonged exposure to air at elevated temperatures, disqualifies all of the polyimides derived from diamine components having such groupings as —O—,

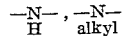

separating aminoalkyl groups. These polymers are invariably deficient from the standpoint of the effect of exposure to air at elevated temperature upon the degree of toughness as above-defined.

In Table III, a list of polypyromellitimides is set forth, and the tests in which they failed are also listed. In the table, the tests referred to are those hereinabove described, the significance of the identifying letters being as follows:

A. Degree of toughness (must be at least 2).

B. Retention of degree of toughness of at least 2 after heating for 20 minutes at 360° C. under nitrogen.

C. A "glassy state transition temperature" of at least 100°–105° C.

D. Oxidative stability, i. e. retention of a degree of toughness of at least 2 when films of the polymer (3 to 7 mils in thickness) are heated in air at 175° C. for 3 hours.

TABLE III

*Injection molding characteristics of previously known polypyromellitimides*

| Amine Component of Polypyromellitimide | Injection Molding Characteristics, Adjudged by Tests A, B, C, and D, supra |
| --- | --- |
| ethylene diamine | Fails in Test B. |
| trimethylene diamine | Do. |
| tetramethylene diamine | Do. |
| octamethylene diamine | Do. |
| 1,4-diaminocyclohexane | Do. |
| o-xylenediamine | Do. |
| m-xylenediamine | Do. |
| p-xylenediamine | Do. |
| bis(gamma-aminopropyl)ether | Fails in Test D. |
| bis(gamma-aminopropyl)ethylene glycol ether | Fails in Test C, D. |
| bis(gamma-aminopropyl)sulfide | Fails in Test B, D. |
| 2,11-diaminododecane | Fails in Test C. |
| 1,12-diamino-octadecane | Do. |
| m-phenylene diamine | Fails in Test B. |
| di(gamma-aminopropyl)methylamine | Do. |

The preparation of the polyimides of this invention may be carried out by procedures similar to those previously used in the polyamide and polyimide art. Preferably the initial step of the process is performed by admixing equimolar amounts of the diamine and tetra-acid, di-anhydride or acid ester (e. g. diacid diester) reactant, suitably in a solvent such as a homogenizing mixture of water and alcohol (ethanol, etc.) or other like solvent which forms a pyromellitic salt of the diamine. The initial reaction preferably takes place under a blanket of inert gas so as to prevent the formation of oxidized products. The initial temperature is not highly critical and may be around room temperature, or above, i. e. any temperature up to the boiling temperature of the mixture at the prevailing pressure. After the initial reaction is completed, the solvents are removed by vaporization, leaving a concentrated aqueous mixture. The temperature is then gradually raised to complete the polymerization. The final temperature can be any temperature between about 250° C. and the decomposition temperature of the polymer, and is generally within the range of 250° to 450° C. If desired a Woods metal bath may be used as a heat-exchange medium in this step. The polymers thus obtained are characterized by their high softening point, and their toughness over a broad range of temperature. They have melt viscosities in the desired range hereinabove described and have inherent viscosities (measured in a 0.5% solution in m-cresol) of above 0.5. The best methods of preparation are illustrated further by means of the following examples.

*Example 1.*—A mixture of 10.8296 parts of 4,4-dimethylheptamethylene diamine and 14.9260 parts of pyromellitic anhydride in 25 to 50 parts of aqueous ethanol (water 5 to 10 parts) was heated in a current of nitrogen until the alcohol had evaporated and an aqueous solution of the prepolymer remained. This solution was further heated with removal of water at a temperature of 110° to 138° C. under an atmosphere of nitrogen for a few hours. Finally the temperature was raised gradually to 282° C. with removal of water and held there for thirty minutes. The resulting polymer, which had an inherent viscosity of 1.8 (0.5% in m-cresol), was fabricated at 340° C. into a clear, tough film. Strips of the material could be cold drawn.

*Example 2.*—A mixture of 8.4582 parts of diethyl pyromellitate and 4.3143 parts of 4,4-dimethylheptamethylenediamine in 15 to 25 parts of aqueous ethanol (water 10 parts) was heated in a current of nitrogen until the ethanol had evaporated, and an aqueous solution of prepolymer remained. This solution was further heated with the removal of water at a temperature of 110° to 138° C. under an atmosphere of nitrogen. Finally, the temperature was raised gradually to 282° C. with the removal of water and ethanol and was held there for one hour. During the last thirty minutes, the pressure within the system was reduced to about one millimeter of mercury. The total heating cycle was three and one half hours. The resulting polymer, which had an inherent viscosity of 1.0 (0.5% in m-cresol), was molded at 320° into a tough, colorless film.

*Example 3.*—A diethyl pyromellitate solution was preformed by dissolving 37.0763 parts of pyromellitic anhydride in 200 parts of boiling ethanol. This solution was added to 26.9012 parts of 4,4-dimethylheptamethylenediamine in 100 parts of ethanol. After standing a few minutes, the salt which precipitated was filtered, dried and polymerized, with the removal of water and alcohol, under nitrogen at 138° C. for one hour and at 325° C. for two hours. The resulting polymer molded at 320° C. and had an inherent viscosity of 1.5(0.5% in m-cresol).

*Example 4.*—After dissolving 24.3356 parts of pyromellitic anhydride in 100 parts of absolute methanol, 17.6566 parts of nonamethylenediamine were added. The methanol was then removed on a steam bath and the residual salt was placed in a polymer tube. Polymerization, with the removal of water and methanol, was carried out under nitrogen at 138° C. for two hours and at 325° C. for two hours. The resulting polymer, which had an inherent viscosity of 1.2, could be compression-molded at 340° C. into tough, creasable films.

*Example 5.*—Diethyl pyromellitate was prepared by dissolving 14.3239 parts of pyromellitic anhydride in 75 parts of ethanol. This solution was added quantitatively to a solution of 10.3929 parts of 4,4-dimethylheptamethylenediamine in 25 parts of ethanol. The ionic salt which precipitated was filtered and recrystallized from a mixture of 90 parts ethanol and 10 parts of water. The salt was then filtered, dried and polymerized, with removal of ethanol and water, at 197° C. for two hours and at 282° for one half hour. A tough, pale yellow film was produced by molding the product at 330° C. Inherent viscosity was 0.8 (0.5% in m-cresol).

*Example 6.*—6.7617 parts of pyromellitic anhydride which had been dissolved in 30 parts of ethanol there was added a solution of 4.4714 parts of 3-methylheptamethylene diamine and in 20 parts of ethanol. The ionic salt was filtered and added to 25 parts of water. The solution was first heated at 138° C. for one hour to remove the water flux and then heated at 197° C. for one hour and at 282° C. for one hour. The resultant polymer plug was pressed at 320° C. into a tough, tan colored film. Inherent viscosity (0.5% in m-cresol) of the polymer was 1.1.

The products obtained as described in these examples were found to be capable of retaining an exceptionally high degree of toughness during injection molding. They were especially useful in the form of tubular articles such as pipes. These products were subjected to tests A, B, C, and D, as described above. The results were as follows:

TABLE IV

*Injection molding properties of polyimides*
*(Examples 1–6)*

| Diamine Component of Polypyromellitimide | Toughness | Oxidative Stability, hrs. | Melt Viscosity, 360° C., 20.4 p. s. i. | Glassy State Transition Temperature, ° C. |
|---|---|---|---|---|
| Nonamethylene diamine | 3+ | 20–25 | 3×10⁹ | 110 |
| 4,4-Dimethylheptamethylene diamine | 3+ | 20–30 | 8.6×10³ | 135 |
| 3-Methylheptamethylene diamine | 3+ | 8–10 | less than 6×10⁶ | 135 |

The amines which were employed in the foregoing examples were prepared by the methods described below.

*4,4-dimethylheptamethylenediamine.*—Isoprene was allowed to react with two moles of hydrogen chloride at 0–10° C. to produce isoprene dihydrochloride (2-methyl-2,4-dichlorobutane) which was treated with ethylene and aluminum chloride at —20° C. The 3,3-dimethyl-1,5-dichloropentane, obtained in this way in good yield, was cyanated with anhydrous sodium cyanide in refluxing tetrahydrofurfuryl alcohol and the 4,4-dimethylpimelonitrile formed was reduced catalytically to the diamine.

*Nonamethylenediamine.*—Azelaic acid was heated at 300° for eight hours with a catalytic amount of polyphosphoric acid while an excess of gaseous ammonia was led through. The resultant azelaonitrile was hydrogenated to the diamine with cobalt catalyst in the known manner.

*3-methylheptamethylenediamine.*—Isobutylene and acrylonitrile were reacted under pressure yielding 2-methyl-1-pentenonitrile which was carbonylated and subjected to reduction amination and reduction to the diamine, by the method described in Example 1 of U. S. P. 2,640,082.

It is to be understood that the invention is not limited to the procedures illustrated in the foregoing examples, and that numerous procedures for making the polypyromellitimides of this invention may be applied without departing from the spirit and scope of the invention.

The invention is not dependent upon, or limited by, any theoretical explanation as to the operability and effectiveness thereof. While various theoretical explanations can be offered as to why specific diamines are required for outstanding injection molding properties in the polyimides, no complete or entirely satisfactory theory is now presented in explanation of their results. However, one of the influences which may come into play appears to be a periodicity of properties which causes the polyimides from the even-numbered unbranched diamines of similar chain length to resemble each other more closely than they resemble the polyimides from the adjacent odd-numbered diamines. Evidently there is also an effect of diamine chain length which makes $C_{11}$ and $C_{12}$ favorable, although not as good as $C_9$, $C_8$ and $C_{10}$ being relatively poor. The effect of side chain substitution, when superimposed on the effect of chain length (and periodicity) is difficult to formulate; it appears, moreover, that dimethyl substitution is relatively undesirable when present on the alpha or omega carbon atoms yet not as harmful in the 3,3-position, for example. Steric explanations can be given for some of these phenomena, but, in general, there is as yet no known theory by which the particular species which are suitable for injection molding can be selected in advance of actual trial.

The polypyromellitimides of this invention are especially useful and valuable in the production of shaped articles by injection molding or extrusion, where the articles are to be used over a wide range of temperatures, including, for example, temperatures above those which prior art injection-molded articles are commonly used.

We claim:

1. A polypyromellitimide of a diamine of the class consisting of nonamethylene diamine, 4,4-dimethylheptamethylene diamine, and 3-methylheptamethylene diamine, said polypyromellitimide being characterized in that films thereof having a thickness of 3 to 7 mils can be folded through an angle of 180°, and creased, followed by folding through an angle of 360° and creased again along the original crease line without breaking at the crease line, and characterized further in that such films do not break at the crease line when tested in this same manner after the polypyromellitimide has been heated at 360° C. under nitrogen for 20 minutes, said polypyromellitimide being also characterized in that it has a melt viscosity at 360° C. of not more than $7 \times 10^6$ poises at a shear stress of up to 40 p. s. i. and a glassy state transition temperature above 100° C.

2. Nonamethylene polypyromellitimide.
3. 4,4-dimethylheptamethylene polypyromellitimide.
4. 3-methylheptamethylene polypyromellitimide.
5. Composition of claim 1, in the form of film.
6. Composition of claim 1, in tubular form.

References Cited in the file of this patent

UNITED STATES PATENTS 2,130,947    Carothers _____ Sept. 20, 1938

FOREIGN PATENTS 570,858    Great Britain _____ July 25, 1945

OTHER REFERENCES

Coffman et al.: J. Polymer Science, vol. 2, 1947, pp. 306 to 308.